(12) United States Patent
Hur et al.

(10) Patent No.: US 12,254,041 B2
(45) Date of Patent: Mar. 18, 2025

(54) POSITION RECOGNITION METHOD AND SYSTEM BASED ON VISUAL INFORMATION PROCESSING

(71) Applicant: NAVER LABS CORPORATION, Seongnam-si (KR)

(72) Inventors: Dongcheol Hur, Seongnam-si (KR); Yeong-Ho Jeong, Seongnam-si (KR); Sangwook Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 393 days.

(21) Appl. No.: 17/712,849

(22) Filed: Apr. 4, 2022

(65) Prior Publication Data

US 2022/0230350 A1    Jul. 21, 2022

Related U.S. Application Data

(63) Continuation of application No. PCT/KR2020/016271, filed on Nov. 18, 2020.

(30) Foreign Application Priority Data

Dec. 16, 2019   (KR) .................. 10-2019-0168100

(51) Int. Cl.
*G06F 16/587*    (2019.01)
*G06F 16/583*    (2019.01)
(Continued)

(52) U.S. Cl.
CPC .......... *G06F 16/587* (2019.01); *G06F 16/583* (2019.01); *G06T 7/248* (2017.01); *G06T 7/70* (2017.01)

(58) Field of Classification Search
CPC .. G06F 16/532; G06F 16/583; G06F 16/5854; G06F 16/587; G06F 18/00; G06T 7/248; G06T 7/70; G06T 2207/30244
See application file for complete search history.

(56) References Cited

U.S. PATENT DOCUMENTS

| | | | |
|---|---|---|---|
| 2013/0230214 A1* | 9/2013 | Arth ........................ | G06T 7/74 382/107 |
| 2019/0244050 A1* | 8/2019 | Lin ........................ | G06V 10/17 |
| 2022/0044436 A1* | 2/2022 | Yang ....................... | G01S 19/47 |

FOREIGN PATENT DOCUMENTS

| | | |
|---|---|---|
| KR | 1020060129960 | 12/2006 |
| KR | 1020140136016 | 11/2014 |

(Continued)

OTHER PUBLICATIONS

Alatise et al. "Pose estimation of a mobile robot based on fusion of IMU data and vision data using an extended Kalman filter." Sensors 17.10 (2017): 2164. (Year: 2017).*

(Continued)

*Primary Examiner* — Katrina R Fujita
(74) *Attorney, Agent, or Firm* — GREER BURNS & CRAIN, LTD.

(57) ABSTRACT

A position recognition method and a system based on visual information processing are disclosed A position recognition method according to one embodiment including the steps of: generating a frame image through a camera; transmitting, to a server, a first global pose of the camera and the generated frame image; and receiving, from the server, a second global pose of the camera estimated on the basis of a pose of an object included in the transmitted frame image.

9 Claims, 8 Drawing Sheets

(51) Int. Cl.
G06T 7/246 (2017.01)
G06T 7/70 (2017.01)

(56) References Cited

FOREIGN PATENT DOCUMENTS

| KR | 1020150024351 | 3/2015 |
| KR | 1020180112374 | 10/2018 |
| KR | 1020180123558 | 11/2018 |
| KR | 1020190114652 | 10/2019 |

OTHER PUBLICATIONS

Qin et al. "A General Optimization-based Framework for Local Odometry Estimation with Multiple Sensors." arXiv preprint arXiv:1901.03638 (2019). (Year: 2019).*

Ventura et al. "Global localization from monocular slam on a mobile phone." IEEE transactions on visualization and computer graphics 20.4 (2014): 531-539. (Year: 2014).*

* cited by examiner

POSITION RECOGNITION METHOD AND SYSTEM BASED ON VISUAL INFORMATION PROCESSING

CROSS-REFERENCE TO RELATED APPLICATIONS

This is a continuation application of International Application No. PCT/KR2020/016271, filed Nov. 18, 2020, which claims the benefit of Korean Patent Application No. 10-2019-0168100, filed Dec. 16, 2019.

BACKGROUND OF THE INVENTION

Technical Field

One or more example embodiments of the following description relate to a position recognition method and a system based on visual information processing.

Related Art

There are technologies for providing navigation using a mobile device through global pose estimation of the mobile device. Here, a variety of methods, for example, a global positioning system (GPS), a Wi-Fi positioning system (WPS), and a visual localization (VL), may be used to estimate the global pose of the mobile device. However, in some cases, existing global pose estimation methods may not be used due to issues related to the environment in which the mobile device is located. For example, GPS refers to technology for receiving a signal from a satellite and calculating a current position of a user. A GPS signal that is a satellite signal travels along a relatively straight line and has poor diffraction and reflection and thus, such signals are difficult to use in an indoor environment. As another example, WPS refers to technology for acquiring a position value using information of a wireless access point (AP) coming through WiFi, but this technology is difficult to use in an environment with an insufficient wireless AP.

VL refers to technology that may estimate the global position of a mobile device based on an image captured by the mobile device. The mobile device may transmit a captured image to a VL server, and the VL server may estimate a global position of the mobile device based on the transmitted image. However, such VL methods require the preliminary work of generating a full map of a space by scanning the entire space. Here, expensive equipment, such as a lidar, is required. In addition, in the case of recognizing a position of a mobile terminal device using only VL in a stage in which an initial position is not given, VL conducts a global search using a query image and a false positive is highly likely to occur. In addition, an open space such as an outdoor space is vulnerable to using existing VL due to changes in scale and the environment.

As another example, there is technology for estimating a global position of a mobile terminal device using a two-dimensional (2D) image marker. For example, Korean Patent Laid-Open Publication No. 10-2006-0129960 relates to a mobile robot and a method of calculating a posture of a position thereof in which, when a map data memory stores map data of a moving area, position data of a marker present at a predetermined position of the moving area, identification data of the marker, and position data of a boundary line adjacent to the marker of the moving area, a marker detection unit detects a marker in an image based on the position data and the identification data of the marker, a boundary detection unit detects the boundary line adjacent to the marker in the image, and a parameter calculation unit calculates a parameter of the boundary line in the image, a position and posture calculation unit calculates a position and a posture of a moving robot in the moving area based on the parameter of the boundary line and the position data of the boundary line. However, a scheme of using a 2D image marker normally requires the attachment of a 2D marker to the wall or the floor of a space. However, since the design of the 2D marker does not match the real environment and looks unnatural, users of the corresponding space may be reluctant to use the 2D marker, and users that desire to acquire position information in the corresponding space may have the inconvenience of having to photograph the 2D marker attached to the floor or the marker from the front as much as possible.

BRIEF SUMMARY OF THE INVENTION

Subject

One or more example embodiments provide a position recognition method and system that may recognize a position of a user based on visual information processing for a point of interest (POI).

Solution

According to an aspect of at least one example embodiment, there is provided a position recognition method of a computer apparatus including at least one processor, the position recognition method including, by the at least one processor, generating a frame image through a camera; transmitting a first global pose of the camera and the generated frame image to a server; and receiving, from the server, a second global pose of the camera that is estimated based on a pose of an object included in the transmitted frame image.

According to an aspect, the second global pose may be estimated by transforming a global pose of a target object stored in the server by a relative pose between the camera and the target object included in the frame image that is calculated by analyzing the frame image in the server.

According to another aspect, the receiving of the second global pose of the camera may include receiving, from the server, the second global pose, a first confidence value corresponding to the second global pose, a third global pose as a global pose of the computer apparatus that is estimated based on a global localization at the server, and a second confidence value corresponding to the third global pose; and determining a fourth global pose by assigning different weights based on the first confidence value and the second confidence value to the second global pose and the third global pose.

According to still another aspect, the determining of the fourth global pose may include determining the fourth global pose such that a portion of the second global pose is relatively greater in the fourth global pose as the first confidence value is greater than the second confidence value.

According to still another aspect, the position recognition method may further include, by the at least one processor, tracking a change from the first global pose of the camera to a third global pose; calculating a pose variance based on the third global pose and the first global pose; and determining a fourth global pose by applying the pose variance to the second global pose.

According to still another aspect, the position recognition method may further include, by the at least one processor, determining a fifth global pose by applying a weighted moving average to the third global pose and the fourth global pose.

According to still another aspect, the tracking of the change may include tracking the third global pose by using visual inertial odometry or accumulating a variance of the camera in the first global pose.

According to an aspect of at least one example embodiment, there is provided a position recognition method of a computer apparatus including at least one processor, the position recognition method including, by the at least one processor, registering objects to a database in association with a corresponding global pose; receiving a query image from a mobile device; analyzing the query image and calculating a relative pose between a camera of the mobile device and a target object included in the query image; searching the database for a global pose of the target object; determining a global pose for the camera of the mobile device by transforming the found global pose by the calculated relative pose; and transmitting the determined global pose to the mobile device.

According to an aspect, the transmitting may include transmitting a first global pose as the determined global pose, a first confidence value corresponding to the first global pose, a second global pose of the mobile device that is estimated based on a global localization, and a second confidence value corresponding to the second global pose to the mobile device.

According to another aspect, a third global pose may be determined in the mobile device by assigning different weights to the first global pose and the second global pose based on the first confidence value and the second confidence value.

According to an aspect of at least one example embodiment, there is provided a computer program stored in a computer-readable record medium to implement the method on a computer apparatus in conjunction with the computer apparatus.

According to an aspect of at least one example embodiment, there is provided a computer-readable record medium storing a computer program to implement the method on a computer apparatus.

According to an aspect of at least one example embodiment, there is provided a computer apparatus including at least one processor configured to execute computer-readable instructions. The at least one processor is configured to cause the computer apparatus to generate a frame image through a camera, to transmit a first global pose of the camera and the generated frame image to a server, and to receive, from the server, a second global pose of the camera that is estimated based on a pose of an object included in the transmitted frame image.

According to an aspect of at least one example embodiment, there is provided a computer apparatus including at least one processor configured to execute computer-readable instructions. The at least one processor is configured to cause the computer apparatus to register objects to a database in association with a corresponding global pose, to receive a query image from a mobile device, to analyze the query image and calculate a relative pose between a camera of the mobile device and a target object included in the query image, to search the database for a global pose of the target object, to determine a global pose for the camera of the mobile device by transforming the found global pose by the calculated relative pose, and to transmit the determined global pose to the mobile device.

Effect

According to some example embodiments, it is possible to recognize a position of a user based on visual information processing for a point of interest (POI).

DETAILED DESCRIPTION OF THE INVENTION

Hereinafter, example embodiments will be described with reference to the accompanying drawings.

A position recognition system according to the example embodiments may be implemented by at least one computer apparatus, and a position recognition method according to the example embodiments may be performed through at least one computer apparatus included in the position recognition system. Here, a computer program according to an example embodiment may be installed and run on the computer apparatus. The computer apparatus may perform the position recognition method according to the example embodiments under control of the executed computer program. The computer program may be stored in a computer-readable record medium to computer-implement the position recognition method in conjunction with the computer program.

Figure 1:
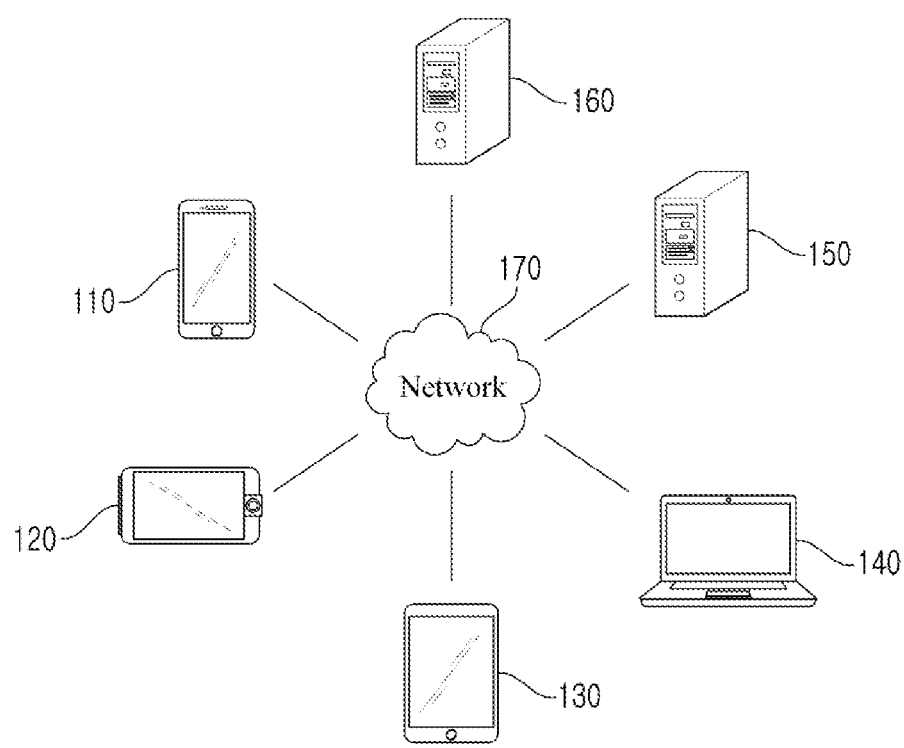
FIG. 1 is a diagram illustrating an example of a network environment according to an example embodiment.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or a number of servers is not limited thereto. Also, the network environment of FIG. 1 is provided as an example only among environments applicable to the example embodiments. The environments applicable to the example embodiments are not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices, as well as a communication scheme using a communication network (e.g., a mobile communication network, wired Internet, wireless Internet, a broadcasting network, etc.) includable in the network 170. For example, the network 170 may include at least one of a variety of network topologies that include a personal area network (PAN), a local area network (LAN), a campus area network (CAN), a metropolitan area network (MAN), a wide area network (WAN), a broadband network (BBN), and the Internet. Also, the network 170 may include at least one of a variety of network topologies that include a bus network, a star network, a ring network, a mesh network, a star-bus network, a tree or hierarchical network, and the like. However, these topologies are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., a location-based service, a content providing service, a group call service (or an audio conference service), a messaging service, a mail service, a social network service, a map service, a translation service, a financial service, a payment service, and a search service) to the plurality of electronic devices 110, 120, 130, and 140 connected over the network 170.

Figure 2:
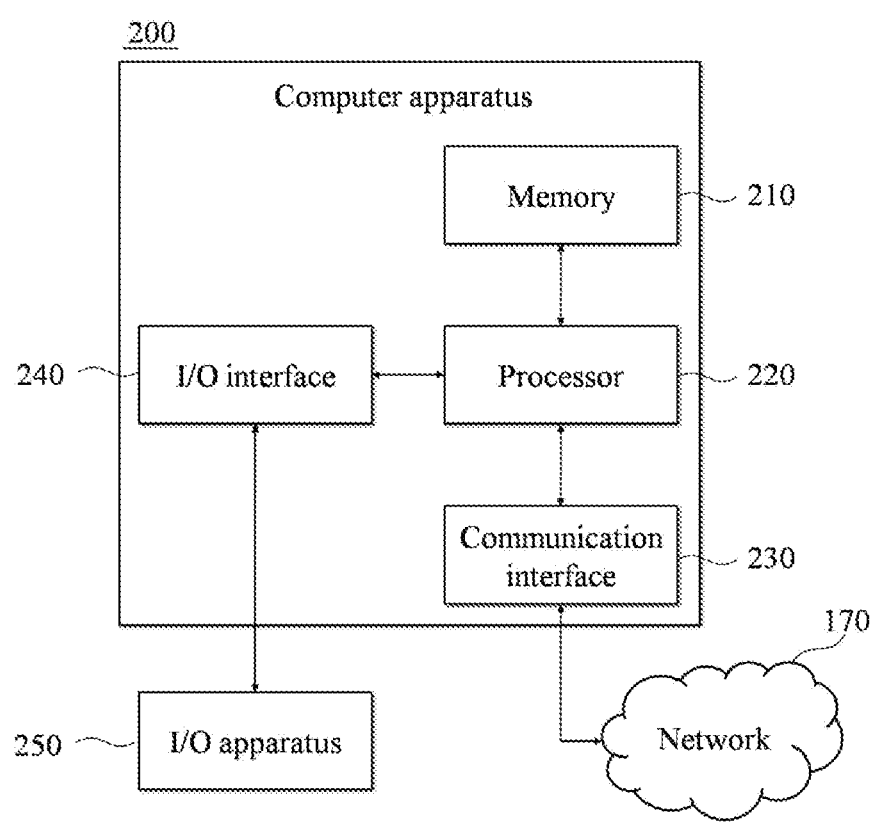
FIG. 2 is a diagram illustrating an example of a computer apparatus according to an example embodiment.

FIG. 2 is a block diagram illustrating an example of a computer apparatus according to at least one example embodiment. Each of the plurality of electronic devices 110, 120, 130, and 140 or each of the servers 150 and 160 may be implemented by the computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable record medium. The permanent mass storage device, such as ROM and a disk drive, may be included in the computer apparatus 200 as a permanent storage device separate from the memory 210. Also, an Operating System (OS) and at least one program code may be stored in the memory 210. Such software components may be loaded to the memory 210 from another computer-readable record medium separate from the memory 210. The other computer-readable record medium may include a computer-readable record medium, for example, a floppy drive, a disk, a tape, a DVD/CD-ROM drive, a memory card, etc. According to other example embodiments, software components may be loaded to the memory 210 through the communication interface 230, instead of the computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus (e.g., the aforementioned storage devices). For example, the processor 220 of the computer apparatus 200 may forward a request or an instruction created based on program code stored in the storage device, such as the memory 210, data, and a file, to other apparatuses over the network 170 under control of the communication interface 230. Inversely, a signal or an instruction, data, a file, etc., from another apparatus may be received at the computer apparatus 200 through the network 170 and the communication interface 230 of the computer apparatus 200. A signal, an instruction, data, etc., received through the communication interface 230 may be forwarded to the processor 220 or the memory 210, and a file, etc., may be stored in a storage medium (e.g., the permanent storage device) that can be included in the computer apparatus 200.

The I/O interface 240 may be a device used for interfacing with an I/O apparatus 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

Also, according to other example embodiments, the computer apparatus 200 may include a number of components greater than or less than the number of components shown in FIG. 2. However, there is no need to clearly illustrate many components according to the related art. For example, the computer apparatus 200 may include at least a portion of the I/O apparatus 250, or may further include other components, for example, a transceiver, a database.

Figure 3:
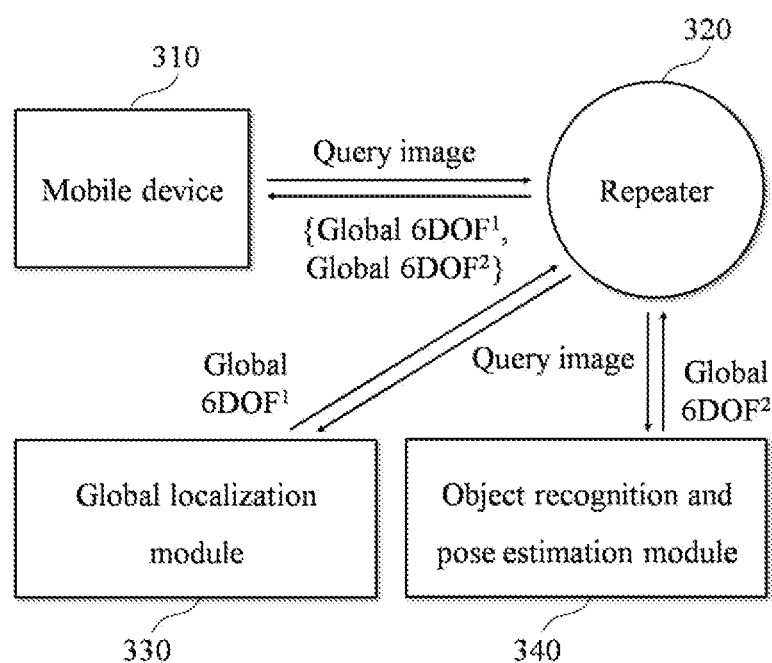
FIG. 3 illustrates an example of a position recognition system according to an example embodiment.

FIG. 3 illustrates an example of a position recognition system according to an example embodiment. A position recognition system 300 according to the example embodiment may include a mobile device 310, a repeater 320, a global localization module 330, and an object recognition and pose estimation module 340.

The mobile device 310 may generate frame images through a camera and may transmit at least one frame image from among the generated frame images as a query image to the repeater 320. For example, a computer program for an augmented reality (AR)-based navigation function may be installed and run on the mobile device 310, and at least one frame image from among a plurality of frame images generated by capturing a surrounding space of the mobile device 310 through the camera may be transmitted as a query image to the repeater 320 under control of the running computer program. Here, since positions of the mobile device 310 over time need to be continuously recognized to provide a navigation function, the mobile device 310 may transmit a frame image to the repeater 320 at predetermined intervals. If the predetermined interval corresponds to an interval at which a frame image is generated, all the generated frame images may be transmitted as the query image to the repeater 320. As another example, if the predetermined interval is less than the interval at which the frame image is generated, a portion of the frame images may be transmitted as the query image to the repeater 320. An interval at which the query image is transmitted may be simply preset or may be dynamically set based on an amount of time used for a server end to process the query image and to calculate a position of the mobile device 310 and/or network traffic between the mobile device 310 and the server end.

The repeater 320, the global localization module 330, and the object recognition and pose estimation module 340 may be included on the server end. Here, the repeater 320, the global localization module 330, and the object recognition and pose estimation module 340 may be implemented in a single physical device or may be implemented in different physical devices. In certain example embodiments, the global localization module 330 may be implemented in a system of a third party such that the server end uses the global localization module 330 through the system of the third party.

The repeater 320 may transmit the query image received from the mobile device 310 to each of the global localization module 330 and the object recognition and pose estimation module 340, and may request pose estimation of the mobile device 310. Here, the term "pose" is defined as a concept that includes a position and an orientation. For example, a pose of the mobile device 310 may be understood as representing a position and an orientation of the mobile device 310 on a world coordinate system. The pose of the mobile device 310 may be represented by, for example, six degrees of freedom (6DOF) having 3DOF for the position and 3DOF for the orientation. The position of the mobile device 310 described below may correspond to the pose of the mobile device 310 depending on example embodiments.

Any module capable of performing global localization for the mobile device 310, such as a global positioning system (GPS), simultaneous localization and mapping (SLAM), a Wi-Fi positioning system (WPS), visual localization (VL), and the like, may be employed for the global localization module 330. In response to a request from the repeater 320, the global localization module 330 may estimate the pose of the mobile device 310 and may transmit the same to the repeater 320. In the example embodiment of FIG. 3, the pose of the mobile device 310 provided from the global localization module 330 is represented as 'Global 6DOF1'.

The object recognition and pose estimation module 340 may estimate the pose of the mobile device 310 based on a target object recognized in an image and may transmit the estimated pose to the repeater 320. The example embodiment of FIG. 3 represents the pose of the mobile device 310 provided from the object recognition and pose estimation module 340 as 'Global 6DOF2'. The object recognition and pose estimation module 340 may register the target object with the assistance of the global localization module 330. For example, the object recognition and pose estimation module 340 may train a two-dimensional (2D) target object or a three-dimensional (3D) target object and may register the same to a database, and may further register a global pose of the target object to the database in association with the target object in an environment in which the global localization module 330 operates. Here, the object recognition and pose estimation module 340 may recognize the target object in the query image transmitted through the repeater 320, and then calculate a relative position between the target object and the mobile device 310 (in detail, a relative position between the target object and the camera of the mobile device 310). The object recognition and pose estimation module 340 stores the global pose of the target object in the database and thus, may estimate a global pose of the mobile device 310 (in detail, a global pose of the camera of the mobile device 310) by transforming the global pose of the target object by the calculated relative position. A method of estimating, by the object recognition and pose estimation module 340, the global pose of the mobile device 310 will be further described herein.

The repeater 320 may receive the pose of the mobile device 310 (e.g., 'Global 6DOF1') estimated by the global localization module 330 and the pose of the mobile device 310 (e.g., 'Global 6DOF2') estimated by the object recognition and pose estimation module 340, and may transfer the same to the mobile device 310. The example embodiment of FIG. 3 represents that the mobile device 310 receives {Global 6DOF1, Global 6DOF2} from the repeater 310.

In this case, the mobile device 310 may determine the global pose of the mobile device 310 based on the received poses {Global 6DOF1, Global 6DOF2}. For example, the mobile device 310 may determine the global pose of the mobile device 310 through confidence-based filtering by assigning a weight based on a confidence value provided from each of the global localization module 330 and the object recognition and pose estimation module 340. In detail, for example, the global pose of the mobile terminal 310 may be calculated according to the following Equation 1.

$$M_{res}^{cam} = \frac{w_1}{w_1 + w_2} \times M_{GL}^{cam} + \frac{w_2}{w_1 + w_2} \times M_{VOT}^{cam} \quad \text{[Equation 1]}$$

In Equation 1, $M_{res}^{cam}$ denotes a final calculated global pose of the mobile device 310, $M_{GL}^{cam}$ denotes a global pose of the mobile device 310 calculated through the global localization module 330, and $M_{VOT}^{cam}$ denotes a global pose of the mobile device 310 calculated through the object recognition and pose estimation module 340. Also, w1 denotes a confidence value of the global localization module 330 and w2 denotes a confidence value of the object recognition and pose estimation module 340. Here, the confidence values w1 and w2 may be real numbers each having a value included in the range of 0 to 1. Such confidence values may be transmitted together when each of the global localization module 330 and the object recognition and pose estimation module 340 transmits the global pose of the mobile device 310.

According to the example embodiment, the object recognition and pose estimation module 340 may recognize a relative pose of the mobile device 310 for a 2D or 3D object of a place registered to the database, and may provide a position of a user at the corresponding place. Also, in an environment in which an existing global pose estimation method such as GPS, WPS, VL, and the like, is available, it is possible to improve the accuracy of pose estimation using the position recognition method as an auxiliary method. In an environment in which the existing global pose estimation method is unavailable, it is possible to estimate a position of a user by using the position recognition method according to the example embodiment alone, and to provide a location-based service such as an AR-based navigation function. For example, according to Equation 1, if the confidence value w1 of the global localization module 330=0, it can be known that a value of $M_{VOT}^{cam}$ provided from the object recognition and pose estimation module 340 is a value of the final calculated global pose $M_{res}^{cam}$ of the mobile device 310.

Figure 4:
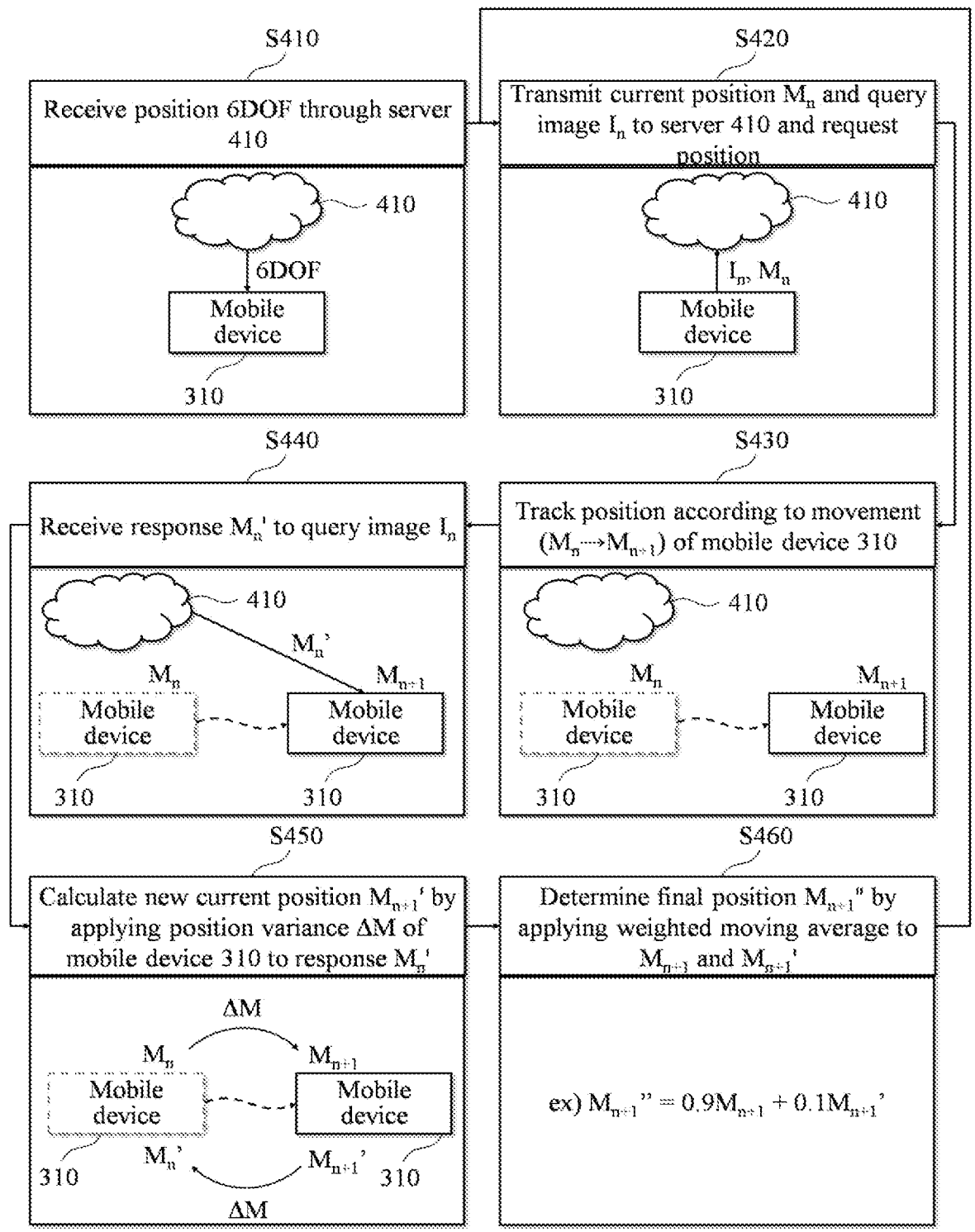
FIG. 4 illustrates an example of a real-time pose estimation process in a global space according to an example embodiment.

FIG. 4 illustrates an example of a real-time pose estimation process in a global space according to an example embodiment.

In operation S410, the mobile device 310 receives a position (6DOF) through a server 410. Operation S410 is a process of acquiring, by the mobile device 310, an initial position. For example, the server 410 includes the repeater 320, the global localization module 330, and the object recognition and pose estimation module 340 described above with reference to FIG. 3, and provides an initial position of the mobile device 310 through the global localization module 330 in operation S410.

In operation S420, the mobile device 310 transmits a current position Mn and a query image In to the server 410 and requests a position. The current position Mn refers to the initial position received in operation S410, and the query image In refers to one of the frame images that are generated through a camera included in the mobile device 310.

In operation S430, the mobile device 310 tracks a position according to a movement (Mn→Mn+1) of the mobile device 310. For example, since the pose provided through the server 410 in the process of FIG. 3 is calculated through a task that requires a large amount of arithmetic operations, it is difficult to use a result value in real time. To supplement this, the mobile device 310 tracks a movement from a first position Mn to a second position Mn+1 of the mobile device 310 until a response from the server 410 is received. For example, the mobile device 310 may track the second position Mn+1 of the mobile device 310 through visual inertial odometry or by accumulating a variance of the camera (e.g., a variance of a position and/or an orientation of the same object in frame images generated through the camera) to the first position Mn.

In operation S440, the mobile device 310 receives a response Mn' to the query image In. The response Mn' is a response to the request of operation S420. Depending on example embodiments, the mobile device 310 may receive the global poses $M_{GL}^{cam}$ and $M_{VOT}^{cam}$ from the global localization module 330 and the object recognition and pose estimation module 340, respectively, and may calculate the global pose $M_{res}^{cam}$ according to Equation 1 and may use the same as the response Mn'.

In operation S450, the mobile device 310 calculates a new current position Mn+1' by applying a position variance ΔM of the mobile device 310 to the response Mn'. Initially, the mobile device 310 calculates the position variance ΔM of the mobile device 310 based on a difference between the current position Mn and the second position Mn+1 estimated in operation S430. The mobile device 310 calculates the new current position Mn+1' by applying the position variance ΔM of the mobile device 310 to the response Mn'.

In operation S460, the mobile device 310 determines a final position Mn+1" by applying a weighted moving average to the second position Mn+1 and the new current position Mn+1'. When providing an AR-based navigation function, the mobile device 310 needs to continuously provide AR content through positions estimated between the first position Mn and the second position Mn+1. For example, in certain embodiments, it may be assumed that the mobile device 310 receives position information from the server 410 three times per second and the mobile device 310 processes 30 calculations per second to provide the AR content, but other timings are also contemplated. Here, the mobile device 310 sequentially processes an operation for providing the AR content through positions estimated by the mobile device 310 until subsequent position information is received from the server 410 and provides the AR content to the user. In this case, the positions estimated by the mobile device 310 gradually approaches the second position Mn+1. Here, as the new current position Mn+1' is calculated in response to receiving the response Mn' from the server 410, a position close to the second position Mn+1 is immediately changed to the new current position Mn+1'. However, since an error may be present between the second position Mn+1 and the new current position Mn+1', a sense of heterogeneity may occur in the AR content at a moment due to an error (difference) between the second position Mn+1 and the new current position Mn+1'. Therefore, the mobile device 310 may reduce a difference between positions applied to the AR content and thereby reduce the sense of heterogeneity that occurs in the AR content by applying the weighted moving average to the second position Mn+1 and the new current position Mn+1'.

The mobile device 310 may perform again operation S420. Here, the current position Mn calculated in operation S420 may be the final position Mn+1" calculated in operation S460.

Figure 5:
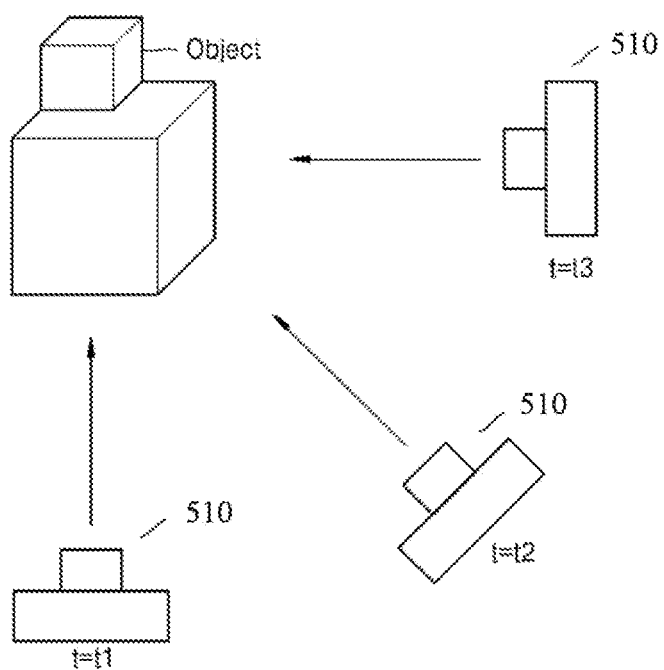
FIG. 5 illustrates an example of capturing a target object through a camera according to an example embodiment.
Figure 6:
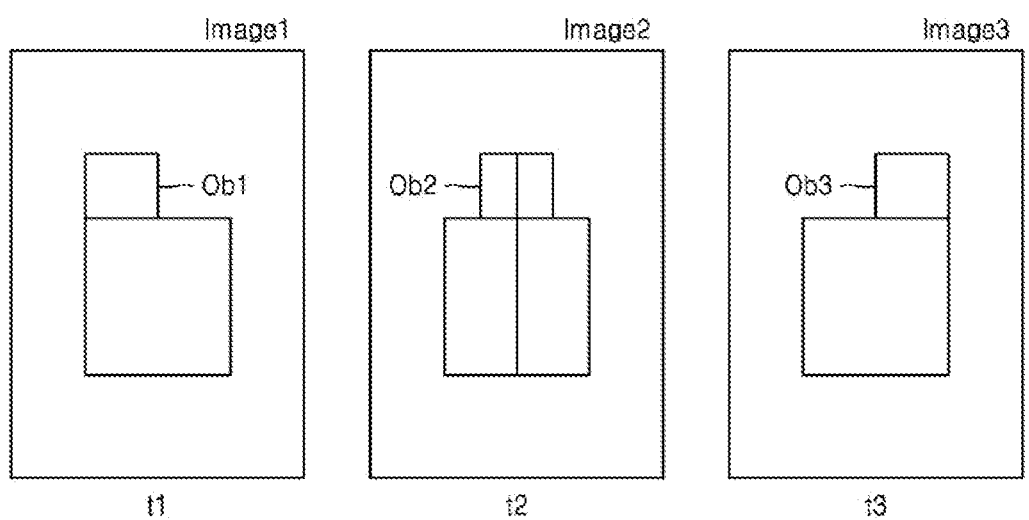
FIG. 6 illustrates an example of images captured through a camera according to an example embodiment.

FIG. 5 illustrates an example of capturing a target object through a camera according to an example embodiment, and FIG. 6 illustrates an example of the images captured through a camera according to an example embodiment.

FIG. 5 illustrates an example in which a camera 510 captures a target object while moving and rotating at first to third times (t1-t3). FIG. 6 illustrates a first image to a third image (Image1-Image3) of target objects (Ob1-Ob3) that are captured by the camera 510 at the first time to the third time (t1-t3).

A device (e.g., the mobile device 310 or the server) that includes the camera 510 or that is communicably connected to the camera 510 may generate an image by capturing a target object using the camera 510. Hereinafter, an example embodiment in which the mobile device 310 with the camera 510 generates an image is described. Also, in the following, the server may refer to an entity that constitutes the server end described above with FIG. 3.

Referring to FIGS. 5 and 6, an image captured from the target object at a first point in time t1 is referred to as the first image Image1, an image captured from the target object at a second point in time t2 is referred to as the second image Image2, and an image captured from the target object at a third point in time t3 is referred to as the third image Image3.

At least one of the images generated by the mobile device 310 may be transmitted to the server through the network 170. For example, the first image Image1 to the third image Image3 may be transmitted to the server. As another example, a subset of the images included in the first image Image1 to the third image Image3 may be transmitted to the server. In the example embodiment, it is assumed that the first image Image1 and the third image Image3 are transmitted to the server and the second image Image2 is not transmitted to the server. An amount of time is required until the mobile device 310 transmits an image to the server and then receives relative pose data from the server. Even in this time, the camera 510 or the mobile device 310 that includes the camera 510 may move, and relative pose data of the target object may vary according to movement of the mobile device 310. In the case of providing an AR-based navigation function, a 3D image of a virtual object rendered by the mobile device 310 is generated based on previous relative pose data of the target object and thus, a sense of heterogeneity may occur in an augmented image. Even before receiving the relative pose data from the server, the mobile device 310 may estimate relative pose data of the target object in a new image based on relative pose data previously received from the server, and may render the 3D image of the virtual object based on the relative pose data of the target object. Therefore, the sense of heterogeneity may significantly decrease in the augmented image.

The second point in time t2 may be after the first point in time t1. The third point in time t3 may be after the second point in time t2. However, it is provided as an example only and the third point in time t3 may be between the first point in time t1 and the second point in time t2.

The camera 510 or the mobile device 310 that includes the camera 510 may move between the first to the third points in time t1, t2, and t3. For example, the camera 510 or the mobile device 310 that includes the camera 510 may perform at least one of a first magnitude of translational motion in a first direction and a second magnitude of rotational motion in a second direction between the first to the third points in time t1, t2, and t3.

The mobile device 310 may store and manage view data of the camera 510 at a point in time at which the camera 510 captures the target object. The mobile device 310 stores first view data at the first point in time t1, stores second view data at the second point in time t2, and stores third view data at the third point in time t3. The mobile device 310 may manage view data by deleting view data stored before a preset time.

The view data of the camera 510 refers to data that is directly related to the pose of the camera 510. The view data of the camera 510 may be a view matrix that represents a movement and a rotation of the world, that is, a fixed subject on a camera coordinate system defined by the pose of the camera 510. In other words, the view data of the camera 510 may refer to a matrix that converts a coordinate value on the world coordinate system to a camera coordinate system or element values of the matrix.

According to the movement of the camera 510, the pose of the camera 510 and the camera coordinate system defined by the pose of the camera 510 varies. The view data of the camera 510 varies according to the movement of the camera 510.

The view data of the camera 510 may have an inverse function relationship with the pose data of the camera 510. The pose data of the camera 510 may be data that represents the pose of the camera 510 on the world coordinate system. That is, the pose data of the camera 510 may refer to a matrix that converts a coordinate value on the camera coordinate system to the world coordinate system or element values thereof.

The mobile device 310 may calculate the pose data of the camera 510 based on the view data of the camera 510, or may calculate the view data of the camera 510 based on the pose data of the camera 510.

Although the view data and the pose data of the camera 510 may be understood as provided with the aforementioned meanings herein, the pose data may be a view matrix and the view data may be an inverse matrix of the pose data, depending on example embodiments.

The mobile device 310 may detect a movement of the camera 510 and may change or newly generate view data according to the movement of the camera 510.

According to an example embodiment, the mobile device 310 may detect a movement of the camera 510 based on a movement of feature points of images captured by the camera 510. For example, the mobile device 310 may detect how feature points in the first image Image1 and feature points in the second image Image2 vary with respect to each other, and may estimate a direction and a magnitude of translational motion of the camera 510 and a direction and a magnitude of rotational motion of the camera 510 based on the detection. According to an example embodiment, the mobile device 310 may generate and manage view data of the camera 510 using visual odometry technology. According to another example embodiment, the mobile device 310 may generate and manage the view data of the camera 510 based on sensor values received from sensors. The sensors may be inertial sensors and may output sensor values showing where and how far the mobile device 310 has moved and rotated.

According to still another example embodiment, the mobile device 310 may generate and manage view data of the camera 510 based on a change in feature points in images captured by the camera 510 and sensor values received from the sensors. For example, the mobile device 310 may generate and manage view data of the camera 510 using visual inertial odometry technology.

The mobile device 310 may receive relative pose data of the target object from the server, and may estimate, store, and manage pose data of the target object based on the received relative pose data of the target object and view data of the camera at the same point in time as that.

For example, the mobile device 310 may calculate and store pose data of the target object based on first relative pose data of the target object of the first point in time t1 received from the server and first view data of the camera 510 of the first point in time t1. The mobile device 310 may calculate pose data of the target object based on third relative pose data of the target object of the third point in time t3 received from the server and third view data of the camera 510 of the third point in time t3.

Pose data (hereinafter, first pose data) of the target object calculated in association with the first point in time t1 and pose data (hereinafter, second pose data) of the target object calculated in association with the third point in time t3 need to theoretically have the same value. However, the first pose data and the second pose data may have a mutually intolerable error due to inaccuracy of a learning model of the server or inaccuracy of view data of the camera 510.

When an error between the first pose data and the second pose data exceeds a reference value, the mobile device 310 may ignore the second pose data. On the other hand, when the error between the first pose data and the second pose data is within the reference value, the mobile device 310 may update pose data used by the mobile device 310 based on the first pose data and the second pose data. For example, the mobile device 310 may update pose data of the target object using an average or a weighted average for the first pose data and the second pose data.

The mobile device 310 may estimate relative pose data of the target object based on the pose data of the target object and the view data of the camera 510.

According to another example, the mobile device 310 may also receive relative pose data of the target object from the server.

The mobile device 310 may track positions of target objects in the images at the first to the third point in times t1 to t3. For example, the server that receives the first image Image1 at the first point in time t1 may estimate a type and a position of the target object in the first image Imgae1 and may provide the estimated type and position of the target object to the mobile device 310. The mobile device 310 may determine a position of the target object in the second image Image2 by tracking the target object based on the position of the target object in the first image Image1. The mobile device 310 may track a position of the target object in the first image Image1 from the second image Image2 by extracting feature points in the first image Image1 and the second image Image2 and by comparing the feature points.

The mobile device 310 may estimate the pose data of the camera 510 based on the view data of the camera 510. Here, the mobile device 310 may calculate the pose data of the camera 510 by calculating an inverse matrix of the view data of the camera 510.

Figure 7:
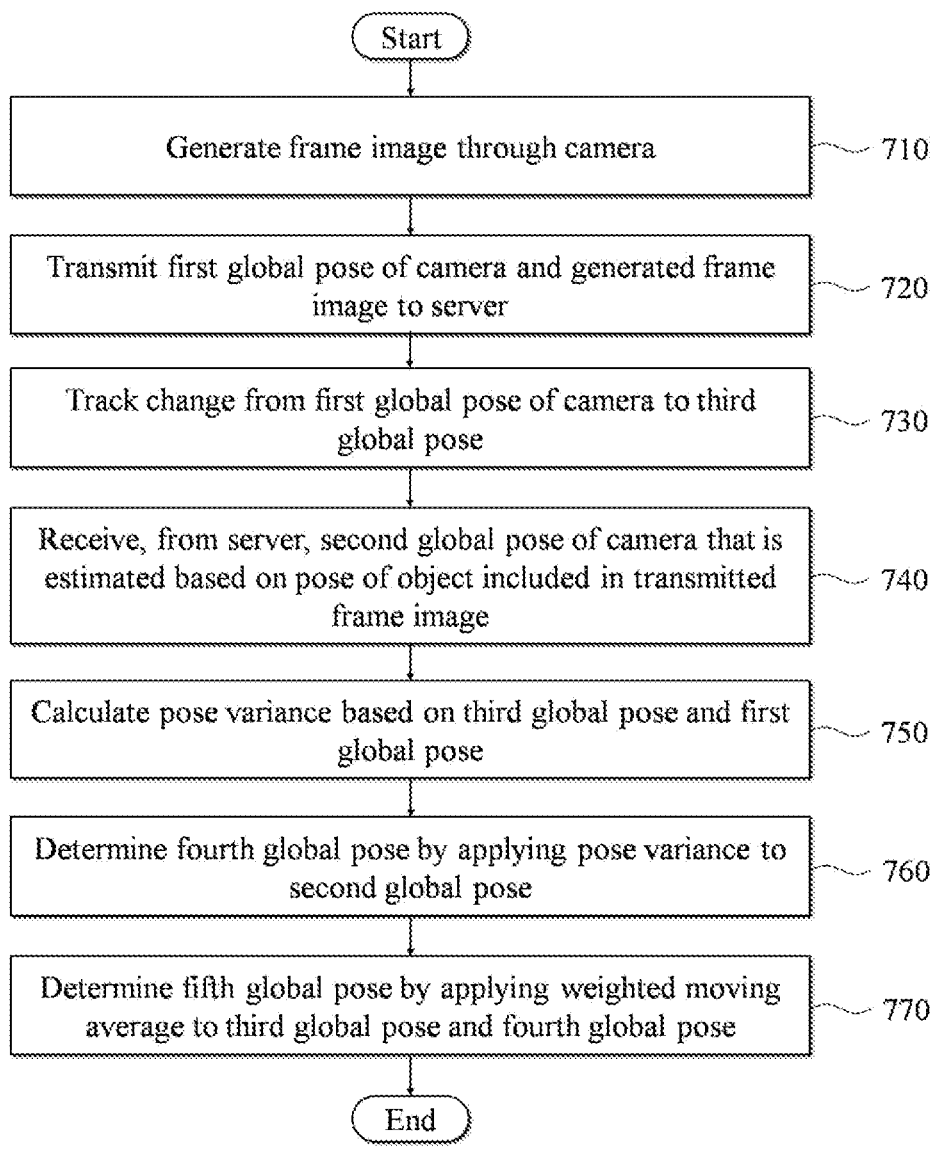
FIG. 7 is a flowchart illustrating an example of a position recognition method of a mobile device according to an example embodiment.

FIG. 7 is a flowchart illustrating an example of a position recognition method of a mobile device according to an example embodiment. The position recognition method according to the example embodiment may be performed by the computer apparatus 200 that implements the mobile device 310. Here, the processor 220 of the computer apparatus 200 may be implemented to execute a control instruction according to a code of at least one computer program or a code of an OS included in the memory 210. Here, the processor 220 may control the computer apparatus 200 to perform operations 710 to 770 included in the method of FIG. 7 in response to the control instruction provided from the code stored in the computer apparatus 200.

In operation 710, the computer apparatus 200 generates a frame image through a camera. Here, the computer apparatus 200 preferably continuously generates frame images through the camera.

In operation 720, the computer apparatus 200 transmits a first global pose of the camera and the generated frame image to a server. For example, an example in which the mobile device 310 transmits the current position Mn and the query image In to the server 410 and requests the position in operation S420 of FIG. 4 is described.

In operation 730, the computer apparatus 200 tracks a change from the first global pose of the camera to a third global pose. For example, as described in operation S430 of FIG. 4, the mobile device 310 tracks the position according to the movement (Mn→Mn+1) of the mobile device 310.

In operation 740, the computer apparatus 200 receives, from the server, a second global pose of the camera that is estimated based on a pose of an object included in the transmitted frame image. For example, as described in operation S440 of FIG. 4, the mobile device 310 receives the response Mn' to the query image In from the server 410. In this case, the second global pose corresponds to the response Mn'. In an example embodiment, the second global pose is estimated by transforming a global pose of a target object stored in the server by a relative pose between the camera and the target object included in the frame image that is calculated by analyzing the frame image in the server.

Meanwhile, here, the second global pose corresponds to the global pose $M_{VOT}^{cam}$ from the object recognition and pose estimation module 340. Therefore, in addition to the second global pose, the computer apparatus 200 further receives, from the server, the first confidence value w1 corresponding to the second global pose, the global pose $M_{GL}^{cam}$ of the computer apparatus 200 that is estimated based on global localization, and the second confidence value w2 corresponding to the global pose $M_{GL}^{cam}$. In this case, the computer apparatus 200 determines the global pose $M_{res}^{cam}$ by assigning different weights based on the first confidence value and the second confidence value to the second global pose $M_{VOT}^{cam}$ and the global pose $M_{GL}^{cam}$. Here, the computer apparatus 200 may determine the global pose $M_{res}^{cam}$ such that a portion of the second global pose $M_{VOT}^{cam}$ is relatively greater in the global pose $M_{res}^{cam}$ as the first confidence value is greater than the second confidence value. As a detailed example, an example embodiment of determining the global pose $M_{res}^{cam}$ through Equation 1 is described. As described above, the computer apparatus 200 may receive the global poses $M_{GL}^{cam}$ and $M_{VOT}^{cam}$ from the global localization module 330 and the object recognition and pose estimation module 340, respectively, and may calculate the global pose $M_{res}^{cam}$ according to Equation 1 and may use the same as the response Mn'.

In operation 750, the computer apparatus 200 calculates a pose variance based on the third global pose and the first global pose. For example, the computer apparatus 200 may calculate the pose variance based on a difference between the third global pose and the first global pose.

In operation 760, the computer apparatus 200 determines a fourth global pose by applying the pose variance to the second global pose. For example, an example of calculating the new current position Mn+1' by applying the position variance ΔM of the mobile device 310 to the response Mn' through operation S450 is described. Here, the second global pose may correspond to the response Mn' and the fourth global pose may correspond to Mn+1'.

In operation 770, the computer apparatus 200 determines a fifth global pose by applying a weighted moving average to the third global pose and the fourth global pose. For example, an example of determining the final position Mn+1" by applying the weighted moving average to Mn+1 and Mn+1' in operation S460 of FIG. 4 is described. Here, the third global pose may correspond to Mn+1, the fourth global pose may correspond to Mn+1', and the fifth global pose may correspond to Mn+1".

Figure 8:
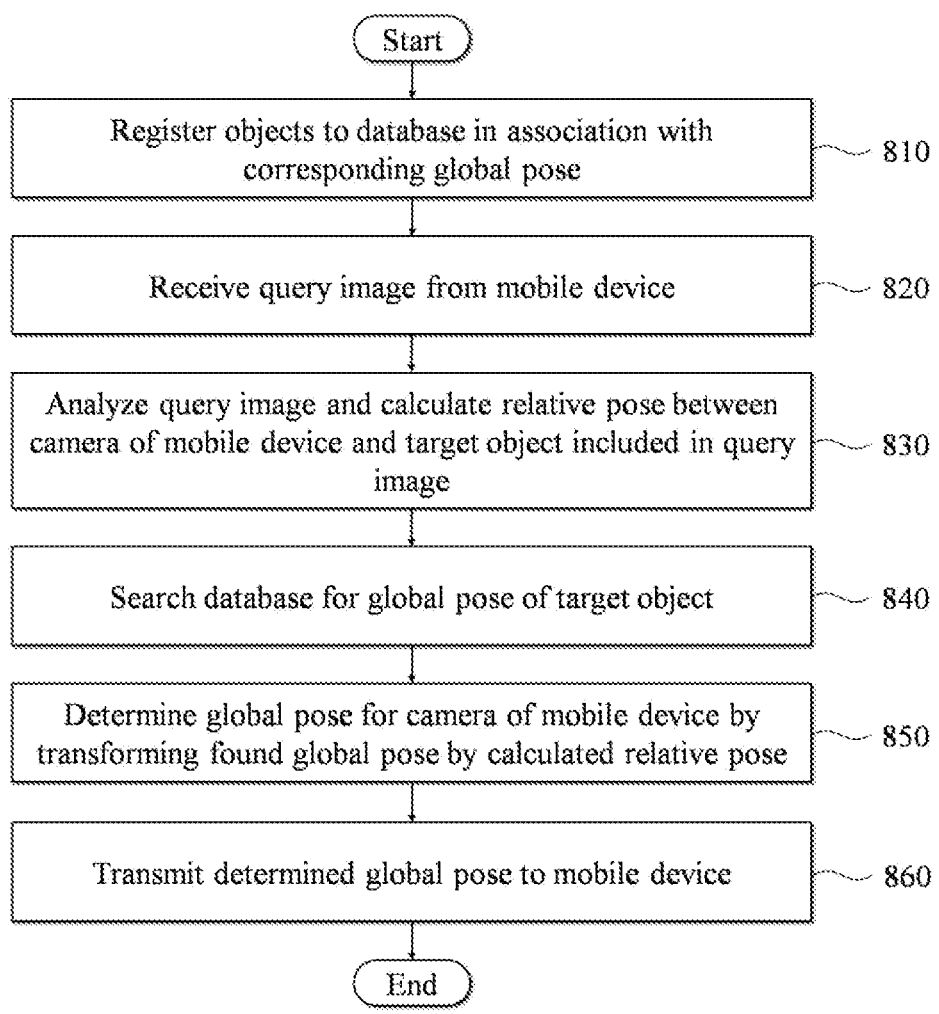
FIG. 8 is a flowchart illustrating an example of a position recognition method of a server according to an example embodiment.

FIG. 8 is a flowchart illustrating an example of a position recognition method of a server according to an example embodiment. The position recognition method according to the example embodiment may be performed by the computer apparatus 200 that implements the object recognition and pose estimation module 340. Here, the processor 220 of the computer apparatus 200 may be implemented to execute a control instruction according to a code of at least one computer program or a code of an OS included in the memory 210. Here, the processor 220 may control the computer apparatus 200 to perform operations 810 to 860 included in the method of FIG. 8 in response to the control instruction provided from the code stored in the computer apparatus 200.

In operation 810, the computer apparatus 200 registers objects to a database in association with a corresponding global pose. The computer apparatus 200 registers a plurality of objects to the database, and stores a global pose for each of the plurality of objects in the database in association with a corresponding object with the assistance of the global localization. For example, the global pose of the object may be determined through the global localization module 330 of FIG. 3.

In operation 820, the computer apparatus 200 receives a query image from a mobile device. Here, the mobile device may correspond to the mobile device 310, and the query image may be one of frame images generated through the camera included in the mobile device 310.

In operation 830, the computer apparatus 200 analyzes the query image, and calculates a relative pose between the camera of the mobile device and a target object included in the query image. A method of calculating the relative pose between the target object included in the image and the camera that captures the image using the image was described above with reference to FIGS. 5 and 6.

In operation 840, the computer apparatus 200 searches the database for a global pose of the target object. For example, the computer apparatus 200 may search the database for a target object recognized in the query image and may extract a global pose stored in the database in association with the corresponding object as the global pose of the target object.

In operation 850, the computer apparatus 200 determines a global pose for the camera of the mobile device by transforming the found global pose by the calculated relative pose. The relative pose refers to a relative pose with the target object of the camera. When the global pose of the target object is known, the computer apparatus 200 may estimate the global pose for the camera by shifting the global pose of the target object.

In operation 860, the computer apparatus 200 transmits the determined global pose to the mobile device. Depending on example embodiments, the computer apparatus 200 may transmit a first global pose as the determined global pose, a first confidence value corresponding to the first global pose, a second global pose of the mobile device that is estimated based on a global localization, and a second confidence value corresponding to the second global pose to the mobile device. In this case, a third global pose may be determined by assigning different weights based on the first confidence value and the second confidence value to the first global pose and the second global pose in the mobile device.

As described above, according to some example embodiments, it is possible to recognize a position of a user based on visual information processing about a POI.

The systems or apparatuses described herein may be implemented using hardware components a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purposes of simplicity, the description of a processing device is provided as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in the form of program instructions performed through various computer devices and recorded in computer-readable media. The media may include, alone or in combination with program instructions, a data file, a data structure, and the like. Here, the media may continuously store computer-executable programs or may in a transitory manner store the same for execution or download. Also, the media may be any of various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media include record media and storage media managed by an app store that distributes applications or a site that supplies and distributes other various types of software, a server, and the like. Examples of the program instruction include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A position recognition method of a computer apparatus comprising at least one processor, the position recognition method, which uses the at least one processor, comprising:
generating a frame image through a camera;
transmitting a first global pose of the camera and the generated frame image to a server; and
receiving, from the server, a second global pose of the camera that is estimated based on a pose of an object included in the transmitted frame image,
wherein the receiving of the second global pose of the camera comprises:
receiving, from the server, the second global pose, a first confidence value corresponding to the second global pose, a third global pose as a global pose of the computer apparatus that is estimated based on a global localization at the server, and a second confidence value corresponding to the third global pose; and
determining a fourth global pose by assigning different weights based on the first confidence value and the second confidence value to the second global pose and the third global pose.

2. The position recognition method of claim 1, wherein the second global pose is estimated by transforming a global pose of a target object stored in the server by a relative pose between the camera and the target object included in the frame image that is calculated by analyzing the frame image in the server.

3. The position recognition method of claim 1, wherein the determining of the fourth global pose comprises determining the fourth global pose such that a portion of the second global pose is relatively greater in the fourth global pose as the first confidence value is greater than the second confidence value.

4. The position recognition method of claim 1, further comprising using the at least one processor for:
   tracking a change from the first global pose of the camera to a fifth global pose;
   calculating a pose variance based on the fifth global pose and the first global pose; and
   determining a sixth global pose by applying the pose variance to the fourth global pose.

5. The position recognition method of claim 4, further comprising using the at least one processor for:
   determining a seventh global pose by applying a weighted moving average to the fourth global pose and the fifth global pose.

6. The position recognition method of claim 5, wherein the tracking of the change comprises tracking the third global pose by using visual inertial odometry or accumulating a variance of the camera in the first global pose.

7. A computer-readable record medium storing a computer program to implement the method according to claim 1 on a computer apparatus.

8. A position recognition method of a computer apparatus comprising at least one processor, the position recognition method, which uses the at least one processor, comprising:
   registering objects to a database in association with a corresponding global pose;
   receiving a query image from a mobile device;
   analyzing the query image and calculating a relative pose between a camera of the mobile device and a target object included in the query image;
   searching the database for a global pose of the target object;
   determining a global pose for the camera of the mobile device by transforming the found global pose by the calculated relative pose; and
   transmitting the determined global pose to the mobile device,
   wherein the transmitting comprises:
   transmitting a first global pose as the determined global pose, a first confidence value corresponding to the first global pose, a second global pose of the mobile device that is estimated based on a global localization, and a second confidence value corresponding to the second global pose to the mobile device, and
   wherein a third global pose is determined in the mobile device by assigning different weights based on the first confidence value and the second confidence value to the first global pose and the second global pose.

9. A computer apparatus comprising:
   at least one processor configured to execute computer-readable instructions, wherein the at least one processor is configured to cause the computer apparatus to:
   register objects to a database in association with a corresponding global pose,
   receive a query image from a mobile device,
   analyze the query image and calculate a relative pose between a camera of the mobile device and a target object included in the query image,
   search the database for a global pose of the target object,
   determine a global pose for the camera of the mobile device by transforming the found global pose by the calculated relative pose, and
   transmit the determined global pose to the mobile device, and
   wherein the at least one processor is also configured to cause the computer apparatus to transmit to the mobile device:
   a first global pose as the determined global pose,
   a first confidence value corresponding to the first global pose,
   a second global pose of the mobile device that is estimated based on a global localization, and
   a second confidence value corresponding to the second global pose, and
   wherein the mobile device is configured to determine a third global pose by assigning different weights based on the first confidence value and the second confidence value to the first global pose and the second global pose.

* * * * *